(12) United States Patent
Sharma et al.

(10) Patent No.: US 12,511,935 B2
(45) Date of Patent: Dec. 30, 2025

(54) FIDUCIAL MARK DOCUMENT SHARING

(71) Applicant: Hewlett-Packard Development Company, L.P., Spring, TX (US)

(72) Inventors: Vishal Sharma, Pune (IN); Gaurav Roy, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 507 days.

(21) Appl. No.: 18/043,902

(22) PCT Filed: Sep. 8, 2021

(86) PCT No.: PCT/US2021/049359
§ 371 (c)(1),
(2) Date: Mar. 2, 2023

(87) PCT Pub. No.: WO2022/060602
PCT Pub. Date: Mar. 24, 2022

(65) Prior Publication Data
US 2023/0316806 A1     Oct. 5, 2023

(30) Foreign Application Priority Data
Sep. 18, 2020    (IN) .............................. 202041040538

(51) Int. Cl.
  *H04L 9/32* (2006.01)
  *G06K 7/14* (2006.01)
  *G06V 40/16* (2022.01)
(52) U.S. Cl.
  CPC ......... *G06V 40/172* (2022.01); *G06K 7/1417* (2013.01)

(58) Field of Classification Search
  CPC ....... G06K 7/1417; G06F 21/32; G06F 21/64; G06F 21/16; H04L 9/3231; H04L 9/3247; H04L 12/1822; H04L 63/0823; H04L 63/0861; H04N 7/15
  See application file for complete search history.

(56) References Cited

U.S. PATENT DOCUMENTS

| | | | |
|---|---|---|---|
| 8,489,887 B1 * | 7/2013 | Newman .......... | H04N 21/25875 713/168 |
| 9,497,412 B1 * | 11/2016 | Rosenberg ................ | H04L 1/20 |
| 9,560,317 B2 | 1/2017 | Brady et al. | |
| 9,607,138 B1 * | 3/2017 | Baldwin ............... | H04W 12/06 |

(Continued)

FOREIGN PATENT DOCUMENTS

CN         104506562 A      4/2015

*Primary Examiner* — Ali S Abyaneh
(74) *Attorney, Agent, or Firm* — Quarles & Brady LLP

(57) ABSTRACT

In an example implementation according to aspects of the present disclosure, a system, method, and storage medium comprising a processor, memory, and instructions to receive a fiducial mark, wherein the fiducial mark encodes a user identity, a face descriptor, a background descriptor, and a signature block. The system decodes the fiducial mark and validates the signature block against a public key repository system. The system validates the user identity against an identity management system and validates the face descriptor against a face descriptor repository. The system validates the background descriptor against a background descriptor repository and responsive to successful validation, allows a document to be shared in an online conference.

15 Claims, 4 Drawing Sheets

(56) References Cited

U.S. PATENT DOCUMENTS

| | | |
|---|---|---|
| 2003/0158864 A1 | 8/2003 | Samn |
| 2007/0047816 A1 | 3/2007 | Graham et al. |
| 2007/0188598 A1 | 8/2007 | Kenoyer |
| 2011/0169605 A1 | 7/2011 | Gunn |
| 2011/0271332 A1 | 11/2011 | Jones et al. |
| 2013/0109961 A1 | 5/2013 | Bose et al. |
| 2015/0180839 A1 | 6/2015 | Moffat |
| 2018/0083978 A1* | 3/2018 | Pantazelos ............ H04W 12/06 |
| 2018/0109570 A1* | 4/2018 | Kowal .................. H04L 65/403 |
| 2019/0073490 A1 | 3/2019 | Agrawal et al. |
| 2019/0197443 A1 | 6/2019 | Anderson et al. |
| 2020/0090338 A1 | 3/2020 | Fiala |
| 2021/0194872 A1* | 6/2021 | Chang ................. H04L 12/1895 |

* cited by examiner

FIDUCIAL MARK DOCUMENT SHARING

BACKGROUND

Online video conferences allow users to virtually meet and communicate both visually and audibly. Online video conferences may allow users to display digital documents within the conference.

DETAILED DESCRIPTION

Online video conferences allow many users to congregate in a virtualized environment, whereby all of the users may be in physically distant locations yet are able to communicate in real time with the other users. Video and audio streams transmitted from each of the user's corresponding computing devices to each of receiving user's computing devices. In another implementations, the transmitted video and audio streams may be transmitted to a server where the streams may be multiplexed into a single video and audio stream which includes all of the users' video and audio. Simply stated the video stream corresponds to one or more video feeds within an online conference. For purposes of this disclosures, users and participants may be used interchangeably, and may correspond to an individual who has connected electronically to an online video conference through a computing device.

Online video conferences also may allow users to share their computing device desktops. The sharing allows participating users to see and experience the presenter's actions and activities as if the presenter were physically nearby. Additionally, a presenter may share a document during the online video conference. The document may include confidential information. In online video conferences with large numbers of participants, a nefarious user may photograph, or screen capture a confidential document when it is shared. Similarly, one participant receiving the shared document in an unsecured or public location, may be subject to bystander eavesdropping, thereby jeopardizing any confidential information in the shared document. Described herein is a fiducial mark document sharing system.

In one implementation, the system may include a video conferencing agent. The agent may be optionally added to an online conference as an optional attendee, or in another implementation, the agent may monitor the online conference as a service with no visibility to the participants or users. The video conferencing agent receives a video stream from an online conference participant. From the video stream a quick response (QR) code may be presented as an overlay on an online conference participant's video stream. The QR code may be encoded authentication characteristic for that particular participant. For validation to be successful, and online documentation to be shared, all participants may include the QR code overlay, and validated authentication characteristics.

The system may utilize a processor and memory hosting instructions, as the agent, to scan a fiducial mark, decode the fiducial mark, validate a signature block, validate a user identity, validate a face descriptor, and validate a background descriptor before allowing a sharing of an online document.

Figure 1:
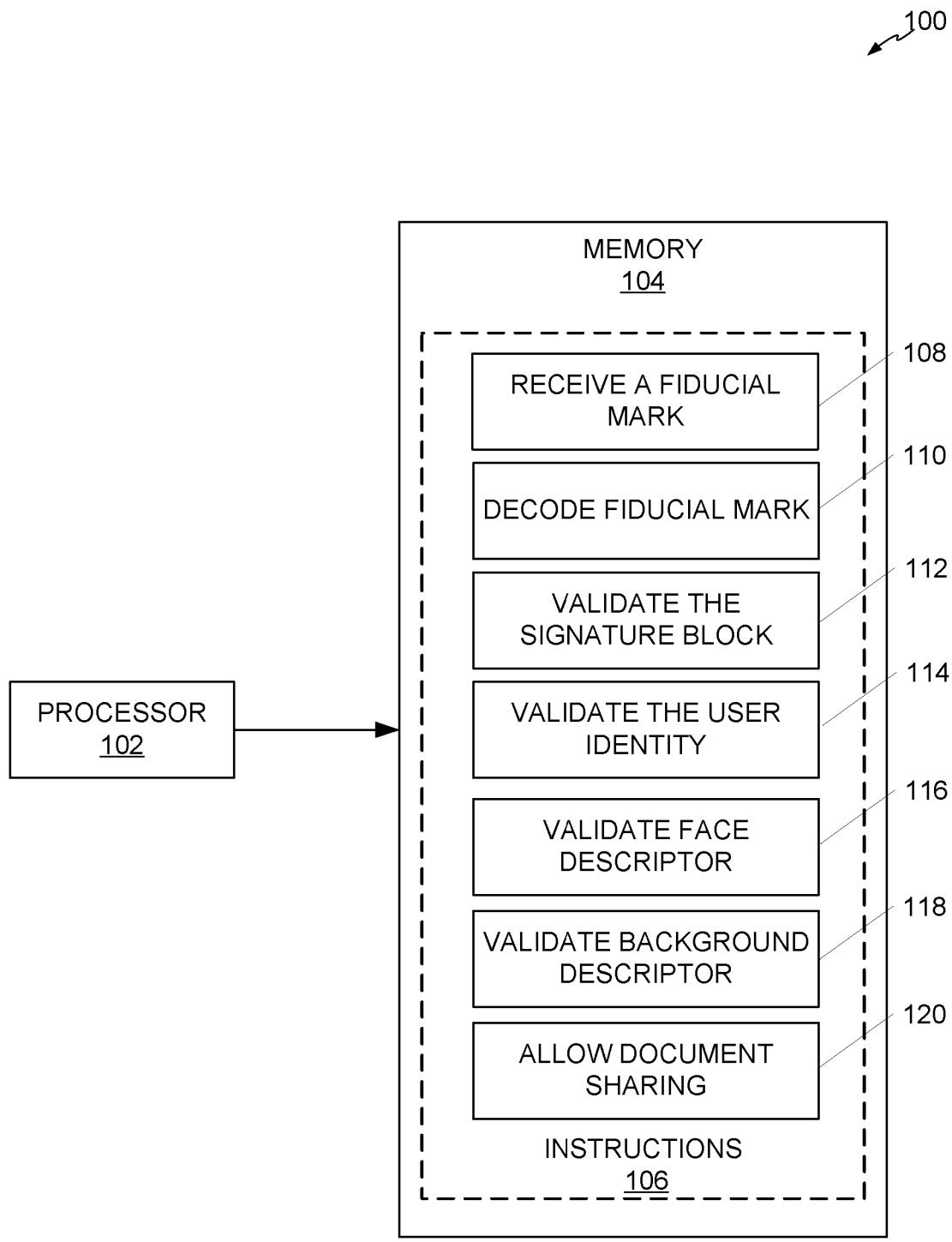
FIG. 1 illustrates fiducial mark document sharing system, according to an example.

FIG. 1 illustrates fiducial mark document sharing system 100, according to an example. The system 100 may include a processor 102, a memory 104, and instructions 106.

The processor 102 of the system 100 may be implemented as dedicated hardware circuitry or a virtualized logical processor. The dedicated hardware circuitry may be implemented as a central processing unit (CPU). A dedicated hardware CPU may be implemented as a single to many-core general purpose processor. A dedicated hardware CPU may also be implemented as a multi-chip solution, where more than one CPU are linked through a bus and schedule processing tasks across the more than one CPU.

A virtualized logical processor may be implemented across a distributed computing environment. A virtualized logical processor may not have a dedicated piece of hardware supporting it. Instead, the virtualized logical processor may have a pool of resources supporting the task for which it was provisioned. In this implementation, the virtualized logical processor may actually be executed on hardware circuitry; however, the hardware circuitry is not dedicated. The hardware circuitry may be in a shared environment where utilization is time sliced. In some implementations the virtualized logical processor includes a software layer between any executing application and the hardware circuitry to handle any abstraction which also monitors and save the application state. Virtual machines (VMs) may be implementations of virtualized logical processors.

A memory 104 may be implemented in the system 100. The memory 104 may be dedicated hardware circuitry to host instructions for the processor 102 to execute. In another implementation, the memory 104 may be virtualized logical memory. Analogous to the processor 102, dedicated hardware circuitry may be implemented with dynamic ram (DRAM) or other hardware implementations for storing processor instructions. Additionally, the virtualized logical memory may be implemented in a software abstraction which allows the instructions 106 to be executed on a virtualized logical processor, independent of any dedicated hardware implementation.

The system 100 may also include instructions 106. The instructions 106 may be implemented in a platform specific language that the processor 102 may decode and execute. The instructions 106 may be stored in the memory 104 during execution. The instructions 106 may be encoded to perform operations such as receive a fiducial mark 108, decode the fiducial mark 110, validate a signature block 112, validate a user identity 114, validate a face descriptor 116, validate a background descriptor 118, and responsive to the validations completing successfully, allowing document sharing 120.

In one implementation, the fiducial mark may include a quick response (QR) code. The QR code may include both encoded information, and landmark images incorporated to the representation. An optical verification system may properly orient the QR code utilizing the landmark images and may then decode the QR code based on the encoded content. Machine readable fiducial marks may be implemented utilizing existing software libraries.

The fiducial mark may be encoded with information corresponding to authentication characteristics of an online conference participant. In one implementation, the fiducial mark may encode a user identity, a face descriptor, a background descriptor, and a signature block. The user identity may be an identifier within the online conferencing system to identify a participant. In some implementations, the user identity may be an email address corresponding to the participant. The user identity may be any digital representation that may be unique enough to distinguish any single participant from any other participant.

A signature block may be encoded to the fiducial mark. The signature block may be a way to authenticate that the encoded information has not been compromised. For example, the signature block may include encoded information such as a screen share identifier (e.g. conference identifier), user identity, face descriptor, and background descriptor, where the encoded information may be signed or encrypted by a corresponding participant's private key. In one implementation the signature block may include the user's private key. A hash, checksum, or cyclical redundancy check may be utilized to encode the various components of the signature block and then to encode for QR code. Other cryptographic schemes may be utilized to secure the information within the both the signature block, and the QR code, whereby the information encoded may be secured and identifiable to a particular participant.

A face descriptor may be a digital representation of a feature or set of features extracted from a face. The face descriptor corresponds to the face of a user attending the online conference. The face descriptor may be utilized to identify a person based on a feature or a set of features corresponding to the online conference participant. The feature or set of features may minimally identify the face of the participant when compared to a set of face descriptors within a face descriptor repository. The face descriptor may be created at the instantiation of an online conference by imaging the corresponding participants face. The imaging may include digitally photographing the participant's face utilizing a webcam as a standalone prerequisite to join the online conference. In another implementation, the face descriptor may be created at origin of the corresponding participant's video stream, as a capture from that video stream. The capture may be analyzed to create the descriptor after doing feature detection on the participant's face.

Similar to the face descriptor, a background descriptor may be a digital representation of a feature or set of features extracted from background of a participant. The background descriptor corresponds to a known background associated with a user attending the online conference. The background descriptor may be utilized to identify a background based on a feature or a set of features corresponding to the background of an online conference participant. The feature or set of features may minimally identify the background of the online participant when compared to a set of background descriptors within a background descriptor repository. The background descriptor may be created at prior to the instantiation of an online conference by imaging the corresponding participant's background. The imaging may include digitally photographing the participant's background utilizing a webcam as a standalone prerequisite to join the online conference. The capture may be analyzed to create the descriptor after doing feature detection on the participant's background.

The system 100 may include instructions 106. In one implementation, the system 100 may include instructions to receive a fiducial mark 108, wherein the fiducial mark encodes a user identity, a face descriptor, a background descriptor, and a signature block. The fiducial mark 108 may be a QR code as previously discussed. The QR code may encode identifying items including the participant or user identity, the face descriptor, the background descriptor, and the signature block. In one implementation, the fiducial mark 108 may be overlaid on a video stream corresponding to a participant or user in an online conference.

The system 100 may include instructions to decode the fiducial mark 110. The decoding may include utilizing pre-existing hardware or off the shelf software logic to decode the received fiducial mark. QR codes are ubiquitous as well as other machine-readable codes (e.g. Universal Product Codes) and may be decoded utilizing already developed software so that encoded information may be extracted and stored for further processing. The resulting decoded information may still be encoded based on a cryptographic validation.

The system 100 may include instructions to validate the signature block 112 against a public key repository system. As discussed previously, the signature block may be signed by a participant's or user's private key. The system 100 may validate the encryption utilizing a public key from the key repository to validate authenticity of the participate or user included in the online conference. In one implementation, the public key repository may be a X.509 certificate public key repository. After validation of the signature block based on the public key retrieval, the signature block may decrypt all of the encoded information within the fiducial mark, including the user identity, the face descriptor and the background descriptor.

The system 100 may include instructions to validate the user identity 114 against an identity management system. The identity management system may map a user identity to an online conference participant. For example, a user identity may take the form of an email address. The identity management system may be a directory service implemented by the Lightweight Directory Access Protocol (LDAP) of an organization. In this implementation, an LDAP directory service may include Active Directory® (Active Directory is a registered trademark of the MICROSOFT CORPORATION of Redmond, Washington).

The system 100 may include instructions validate the face descriptor 116 against a face descriptor repository. The system 100 may extract the face descriptor and compare it to a face descriptor repository. The face descriptor repository may correspond to a database of face descriptors indexed on participants or users. The database may be organized where pre-submitted face descriptors may be stored and indexed prior to an online conference. In some implementations, the face descriptor repository may be managed in-conjunction with the user identity repository within an organization. For example, upon employment a user may be photographed for a physical identification badge. The photograph may be digitized, and facial features extracted to create a face descriptor for that user. The resultant descriptor may be stored and indexed in the face descriptor repository for future validation in facial recognition activities.

The system 100 may validate the background descriptor 118 against a background descriptor repository. The system 100 may extract the background descriptor and compare it to a background descriptor repository. The background descriptor repository may correspond to a database of background descriptors indexed on participants or users. The database may be organized where pre-submitted background descriptors may be stored and indexed prior to an online conference. In some implementations, the background descriptor repository may be managed in-conjunction with the user identity repository within an organization. For example, a user may submit photographic captures of static work environments (e.g. office area, and home office) where the camera placement mimics that which would occur in an online conference. The background in the image may be processed for feature detection. The features may be utilized to create a background descriptor. The resultant descriptor may be stored and indexed in the background descriptor repository for future validation in background recognition activities. The background descriptor validation allows for validation of recognized or "safe" locals. For example, due to information security protocols in place, office locations would be included in the background descriptor repositories. Due to inherent insecurity, backgrounds corresponding to transient places, such as airports, would not be in the background descriptor repository.

The system 100, may include instructions, responsive to validation, that allows a document to be shared in an online conference. Once the all validation steps have been successfully executed, the system 100 allows a document to be shared. The successful execution of the validation steps indicates that a user has been authenticated both through cryptographic techniques, and facial recognition techniques, but locations of video transmissions have been validated through background descriptor matching. Thereby the system 100 may have determined via the validation of all participants or users, that the online conference is an information secure environment and the online documents have a low probability of being nefariously captured.

Figure 2:
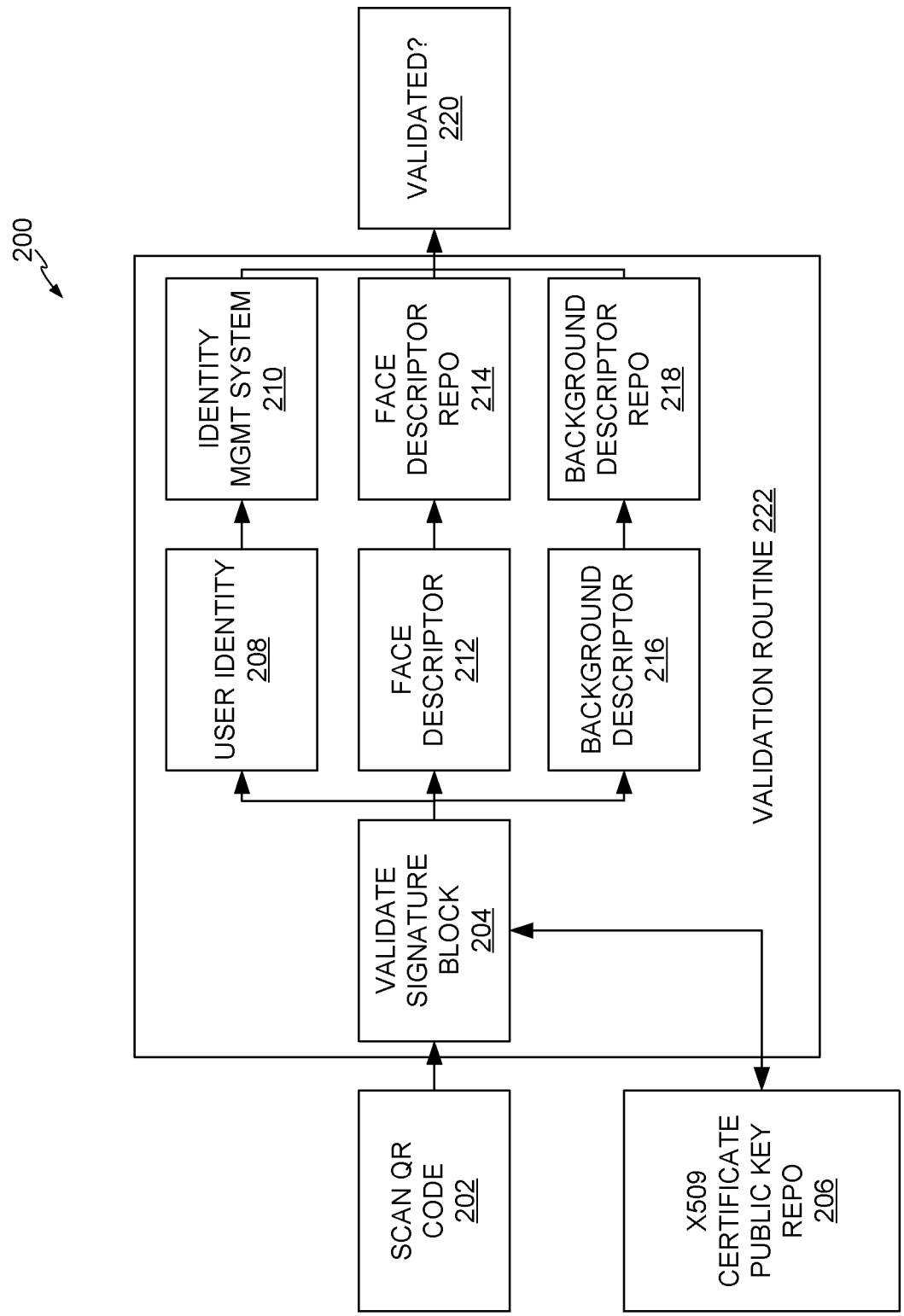
FIG. 2 is a block diagram fiducial mark validation system, according to an example.

FIG. 2 is a block diagram 200 fiducial mark validation system, according to an example. The block diagram 200 may correspond to a visualization of the instructions 106 as described in reference to FIG. 1. As such, in describing the features of FIG. 2, references may be made back to features of FIG. 1.

The system 100 scans a QR code 202. As described in reference to FIG. 1, the system 100 may scan the QR code 202 overlaid on a video stream of an online conference meeting participant. QR code software may convert the machine-readable fiducial mark into a format that may be decrypted by cryptography techniques.

As described in reference to FIG. 1, the signature block is validated 204. The technique of validation may include communicating with an X.509 Certificate Public Key Repository 206. The X.509 Certificate Public Key Repository 206 utilizes the public key to descript the signature block so that any encrypted or encoded information may be retrieved and operated on. As such a failure of the decryption process indicates a security issue and an abort of the validation routine 222.

In the validation routine 222, the validation of user identity 208, face descriptor 212, and background descriptor 216 may be completed in parallel. It should be noted that the failure of the validation of the user identity 208 may also affect the validation of the face descriptor 212 and the background descriptor 216 in an implementation where the respective repositories are indexed on the user identity 208. In another implementation, the user identity 208 may be utilized to retrieve an index for the face descriptor repository 214 and the background descriptor repository 218, where the index may be utilized to retrieve a face descriptor 212 and background descriptor 214 corresponding to the user identity 208. Utilizing this latter approach, the user identity 208 may be obfuscated for security prior to validating the face descriptor 212 against the face descriptor repository 214, and likewise the background descriptor 216 against the background repository 218. In this implementation, the dependency on the identity management system 210 for retrieving an index of into the face descriptor repository 214 and the background descriptor repository 218, limits the parallelization of the validation process.

The validation routine 222 may provide an output to an online conferencing application indicating validation 220. The validation routine 222 may be executed for every participant within an online conference to validated everyone prior to authorizing document sharing. Likewise, the validation routine 222 may be executed periodically as overlaid QR codes are updated as face descriptors and background descriptors change during an online conference. For example, a participant or user with a laptop may move from one location to another. The background may change, and thereby a new background descriptor generated. The validation routine 222 may detect the change in the QR code and execute validation again. Likewise, if a participant or user disables video sharing. In this implementation, the no face descriptor or background descriptor may be encoded or may be encoded as null, and therefore should fail validation.

Figure 3:
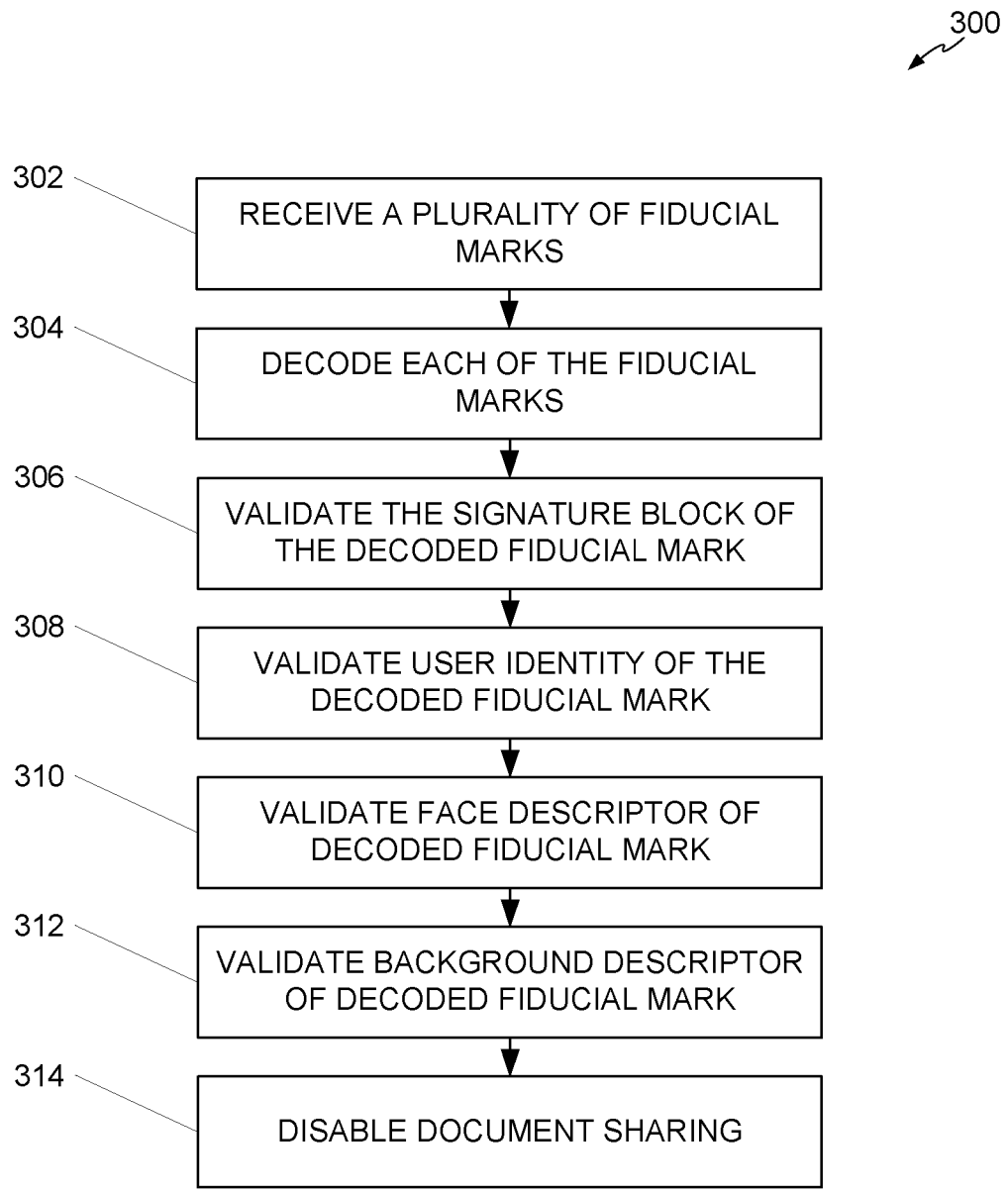
FIG. 3 is a flow diagram for disabling document sharing utilizing a fiducial mark, according to an example.

FIG. 3 is a flow diagram 300 for disabling document sharing utilizing a fiducial mark, according to an example. The flow diagram 300 corresponds to a multi-participant validation of an online conference.

At block 302, the processor 102 receives a plurality of fiducial marks, wherein each of the fiducial marks encodes a user identity, a face descriptor, a background descriptor, and a signature block. As described in reference to FIG. 1, the plurality of fiducial marks may include QR codes. Each of the QR codes correspond to an overlaid QR code on a video stream. Each video stream corresponds to the video of a participant in the online conference. Each of the fiducial marks, or QR codes in this implementation, correspond to encoded information related to the associated participant in the online conference. Each QR code may encode the user identity, a face descriptor, a background descriptor, and a signature block.

At block 304, the processor 102 decodes each of the fiducial marks. The processor 102 may decode each of the fiducial marks in the manner described in reference to FIG. 1. Machine readable marks may be decoded by standardized libraries.

At block 306, the processor 102, validate each of the signature blocks of each of the decoded fiducial marks against a public key repository system. Each signature block may be validated for each participant against an X.509 public key repository. The signature block may be decrypted based on a public key associated with a private key of the participant. If the decryption fails for any individual participant; online document sharing may be disabled.

At block 308, the processor 102 validates each of the user identities of each of the decoded fiducial marks against an identity management system. The validation routine 222 of FIG. 2 may validate each of the users' identities sequentially, or if the processor 102 permits, in parallel. If the validation of the user identity fails for any individual participant; online document sharing may be disabled.

At block 310, the processor 102, validates each of the face descriptors of each of the decoded fiducial marks against a face descriptor repository. The validation routine 222 of FIG. 2 may validate each of the face descriptors sequentially, or if the processor 102 permits, in parallel. If the validation of the face descriptor fails for any individual participant; online document sharing may be disabled.

At block 312, the processor 102, validates each of the background descriptors of each of the decoded fiducial marks against a background descriptor repository. The validation routine 222 of FIG. 2 may validate each of the background descriptors sequentially, or if the processor 102 permits, in parallel. If the validation of the background descriptor fails for any individual participant; online document sharing may be disabled.

At block 314, the processor 102, responsive to a failure of validation, disables sharing of a document in an online conference. As mentioned previously, validation may take place at any failure in the process, or in another implementation, failure of validation may take place upon completion of the processing of all participants and identifying participants that failed authentication. This allows a online conference host, the opportunity to remove participants who may be security problems from the online conference.

Figure 4:
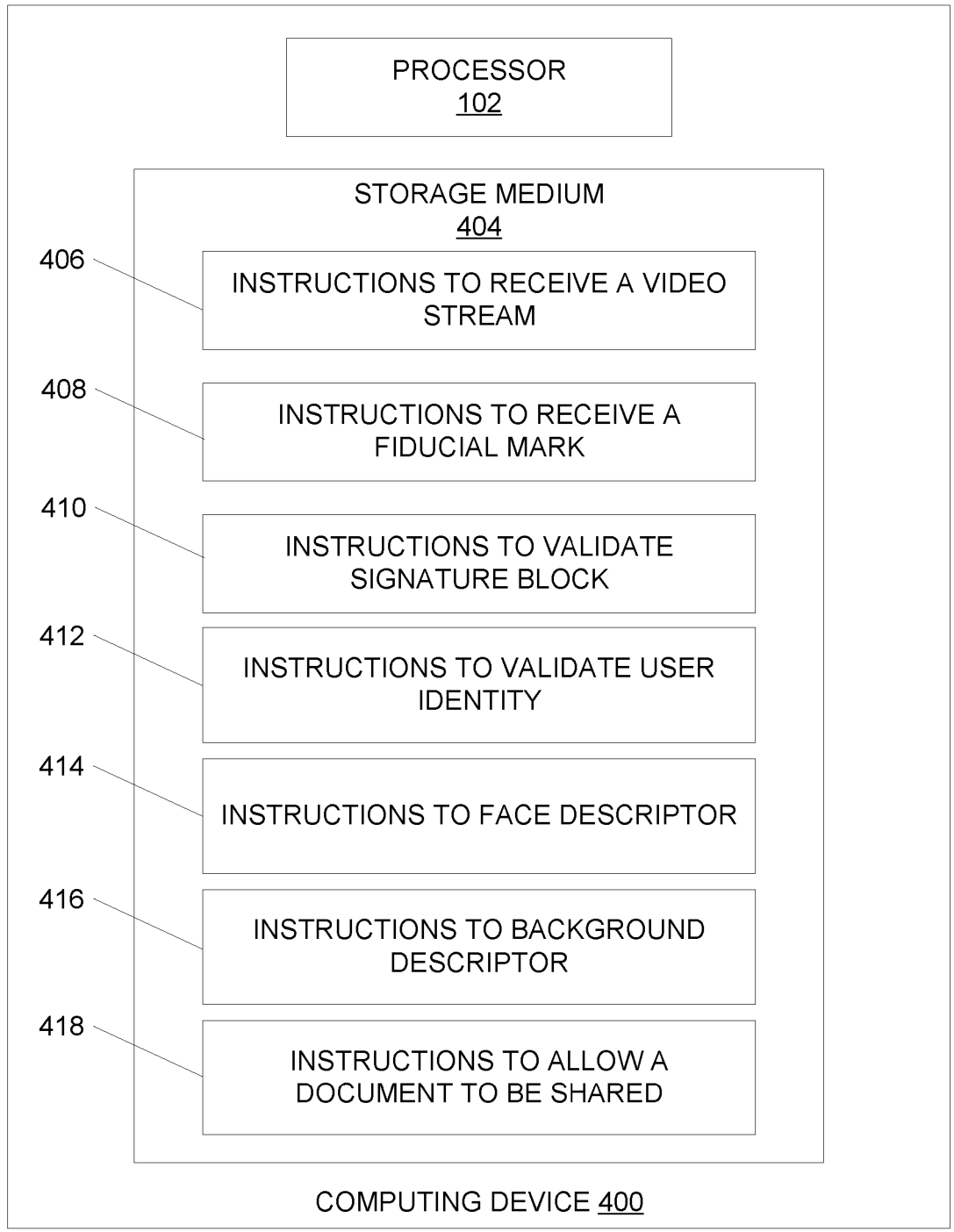
FIG. 4 is a computing device for supporting instructions for a fiducial mark document sharing system, according to an example.

FIG. 4 is a computing device for supporting instructions for a fiducial mark document sharing system, according to an example. The computing device 400 depicts a processor 102 and a storage medium 404 and, as an example of the computing device 400 performing its operations, the storage medium 404 may include instructions 406-420 that are executable by the processor 102. The processor 102 may be synonymous with the processor 102 referenced in FIG. 1. Additionally, the processor 102 may include but is not limited to central processing units (CPUs). The storage medium 404 can be said to store program instructions that, when executed by processor 102, implement the components of the computing device 400.

The executable program instructions stored in the storage medium 404 include, as an example, instructions to receive a video stream from an online conference 406, instructions to receive a fiducial mark, wherein the fiducial mark encodes a user identity, a face descriptor, a background descriptor, and a signature block 408, instructions to decode the fiducial mark 410, instructions to validate the signature block against a public key repository system 412, instructions to validate the user identity against an identity management system 414, instructions to validate the face descriptor against a face descriptor repository 416, instructions to validate the background descriptor against a background descriptor repository 418, and instructions to allow a document to be shared in an online conference responsive to the validations 420.

Storage medium 404 represents generally any number of memory components capable of storing instructions that can be executed by processor 102. Storage medium 404 is non-transitory in the sense that it does not encompass a transitory signal but instead is made up of at least one memory component configured to store the relevant instructions. As a result, the storage medium 404 may be a non-transitory computer-readable storage medium. Storage medium 404 may be implemented in a single device or distributed across devices. Likewise, processor 102 represents any number of processors capable of executing instructions stored by storage medium 404. Processor 102 may be integrated in a single device or distributed across devices. Further, storage medium 404 may be fully or partially integrated in the same device as processor 102, or it may be separate but accessible to that computing device 400 and the processor 102.

In one example, the program instructions 406-420 may be part of an installation package that, when installed, can be executed by processor 102 to implement the components of the computing device 400. In this case, storage medium 404 may be a portable medium such as a CD, DVD, or flash drive, or a memory maintained by a server from which the installation package can be downloaded and installed. In another example, the program instructions may be part of an application or applications already installed. Here, storage medium 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
a processor;
a memory, communicatively coupled to the processor, wherein the memory stores instructions that when executed by the processor cause the processor to:
receive a fiducial mark, wherein the fiducial mark encodes a user identity, a face descriptor, a background descriptor, and a signature block;
decode the fiducial mark;
validate the signature block against a public key repository system;
validate the user identity against an identity management system;
validate the face descriptor against a face descriptor repository;
validate the background descriptor against a background descriptor repository; and
responsive to the validations, allow a document to be shared in an online conference.

2. The system of claim 1, wherein the face descriptor corresponds to a face of a user attending the online conference.

3. The system of claim 2, wherein the background descriptor corresponds to a known background associated with the user attending the online conference.

4. The system of claim 3 wherein the signature block comprises a private key of the user attending the online conference.

5. The system of claim 1 wherein the fiducial mark comprises a quick response code.

6. A method comprising:
receiving a plurality of fiducial marks, wherein each of the fiducial marks encodes a user identity, a face descriptor, a background descriptor, and a signature block;
decoding each of the fiducial marks;
validating each of the signature blocks of each of the decoded fiducial marks against a public key repository system;

validating each of the user identities of each of the decoded fiducial marks against an identity management system;

validating each of the face descriptors of each of the decoded fiducial marks against a face descriptor repository;

validating each of the background descriptors of each of the decoded fiducial marks against a background descriptor repository; and responsive to a failure of the validations, disabling sharing of a document in an online conference.

7. The method of claim 6, wherein each of the face descriptors correspond to a face of each user attending the online conference.

8. The method of claim 7, wherein each of the background descriptors corresponds to a known background associated with each user attending the online conference.

9. The method of claim 8 wherein each of the signature blocks comprises a private key of each user attending the online conference.

10. The method of claim 6 wherein each of the fiducial mark comprise a quick response code.

11. A non-transitory computer readable medium comprising instructions executable by processor to:

receive a video stream from an online conference;

receive a fiducial mark, wherein the fiducial mark encodes a user identity, a face descriptor, a background descriptor, and a signature block;

decode the fiducial mark;

validate the signature block against a public key repository system;

validate the user identity against an identity management system;

validate the face descriptor against a face descriptor repository;

validate the background descriptor against a background descriptor repository; and responsive to the validations, allow a document to be shared in an online conference.

12. The medium of claim 11, wherein the face descriptor corresponds to a face of a user attending the online conference.

13. The medium of claim 12, wherein the background descriptor corresponds to a known background associated with the user attending the online conference.

14. The medium of claim 13 wherein the signature block comprises a private key of the user attending the online conference.

15. The medium of claim 11 wherein the video stream corresponds to a plurality of video feeds within an online conference.

* * * * *